United States Patent

[11] 3,535,981

| [72] | Inventor | Oscar J. Gagne<br>Grosse Pointe, Michigan |
|---|---|---|
| [21] | Appl. No. | 648,654 |
| [22] | Filed | June 26, 1967<br>Continuation-in-part of Ser. No. 643,614,<br>June 5, 1967, now Patent No. 3,461,749. |
| [45] | Patented | Oct. 27, 1970 |
| [73] | Assignee | Precise Services, Inc.<br>Detroit, Michigan<br>a corporation of Michigan |

[54] SYSTEM FOR DUPLICATING A MODEL TO FORM A STYROFOAM CORE IN DIE PRODUCTION
4 Claims, 5 Drawing Figs.

[52] U.S. Cl. .................................................. 90/13.2;
29/529; 144/144
[51] Int. Cl. .................................................. B23q 35/04
[50] Field of Search .......................................... 90/13, 13.1,
13.2; 144/134, 134(2), 144

[56] References Cited
UNITED STATES PATENTS

| 774,027 | 11/1904 | Barr | 144/144 |
|---|---|---|---|
| 1,615,261 | 1/1927 | Edmunds | 90/13.1 |
| 1,874,810 | 8/1932 | Saives | 90/13 |
| 2,702,496 | 2/1955 | Davis et al. | 90/13.1 |
| 2,747,469 | 5/1956 | Ernst et al. | 90/13 |
| 2,831,405 | 4/1958 | Sallwey et al. | 90/13.1 |
| 2,962,940 | 12/1960 | Laurent | 90/13.1 |
| 3,241,454 | 3/1966 | Medley | 90/13 |

*Primary Examiner*—Gerald A. Dost
*Attorney*—Whittemore, Hulbert and Belknap

ABSTRACT: A routing machine for producing from a single unsymmetrical three-dimensional pattern surface a pair of mold core bodies conforming to the configuration of the pattern surface but having a male-female relationship with respect to each other, and a second pair of mold core bodies having a male-female relationship with respect to each other and having a mirror-reversed configuration with respect to the pattern surface.

Patented Oct. 27, 1970
3,535,981
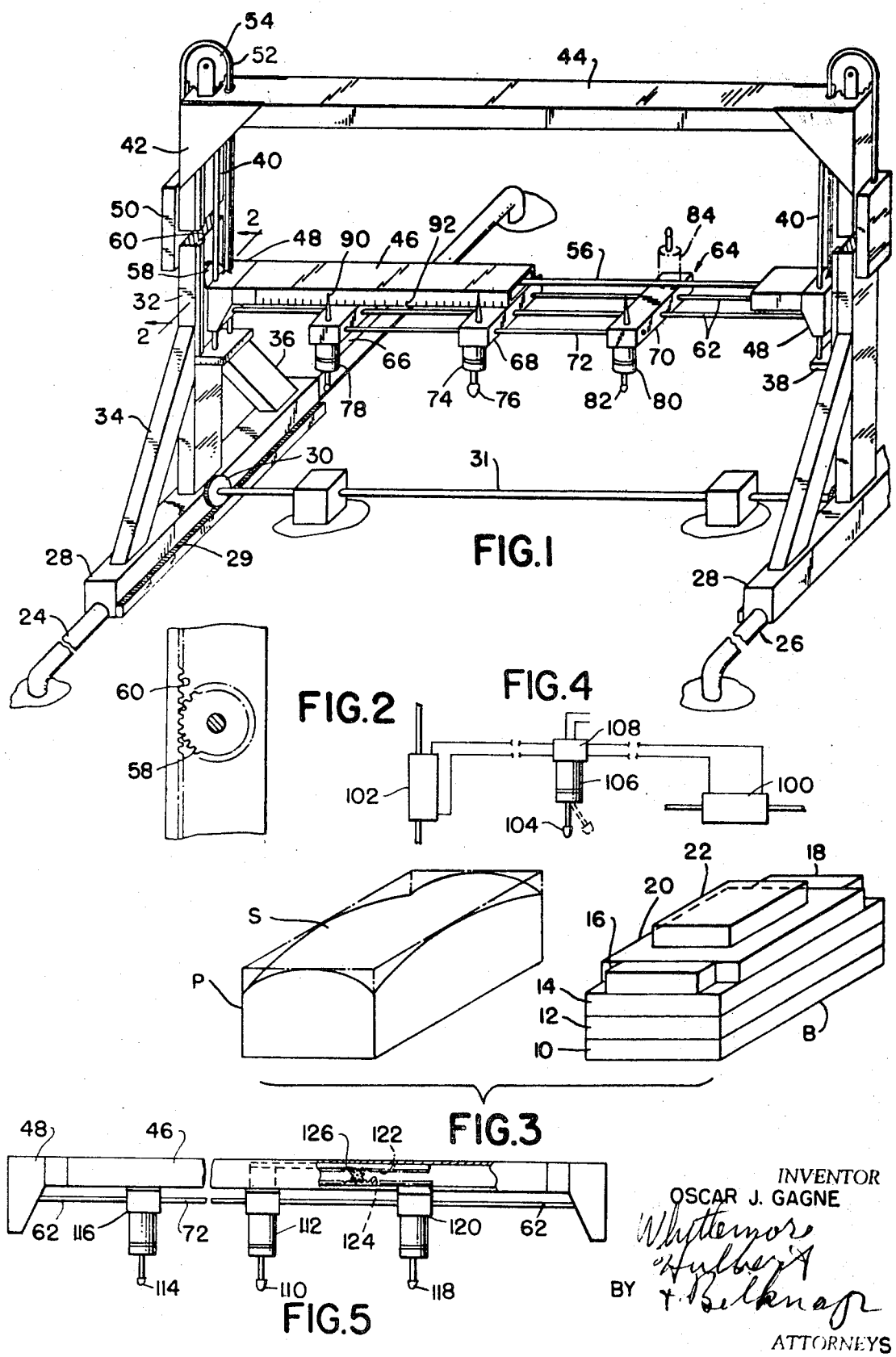
INVENTOR
OSCAR J. GAGNE
BY Whittemore
Hulbert
& Belknap
ATTORNEYS though the cutter is being moved rapidly back and forth over the work.

SYSTEM FOR DUPLICATING A MODEL TO FORM A STYROFOAM CORE IN DIE PRODUCTION

CROSS-REFERENCE TO RELATED APPLICATION

This is a Continuation-in-Part of application Ser. No. 643,614, filed June 5, 1967 now U.S. Pat. No. 3,461,749

BACKGROUND OF THE INVENTION

The present invention relates to the production of large stamping dies used typically in stamping sheet metal to form body components in the automobile industry. For example, a single die may produce the top, fender, door or deck from sheet metal in a single operation.

In the production of the dies for stamping the parts the method involves first the production of the model which has the exact shape desired in the part of the finished automobile for which the die is intended. The model may be formed of plaster or reproduced in wood, or other material.

The problem which the present invention solves is the production of a metal die from the model of the finished product.

It is of course possible to cut a die from a solid block of metal using a Kellering machine guided by a follower which moves in a multiplicity of parallel paths over the model However, unless the block of metal has previously been formed to approximate shape, the Kellering operation must be carefully controlled since the depth of cut might vary from a very small amount to a very substantial amount with possibility of breaking cutters or at the very least, the lack of a capability to form a cut at a reasonable speed dependent upon the depth of cut.

More recently, there have been operations in which a foamed plastic such for example as styrofoam is provided with one surface conforming closely to the desired shape in the die or to the counterpart of the desired shape in the finished piece. This styrofoam member is used as a permanent core in a sand mold provided with gates, risers, and vents. When molten steel is poured into the gates the styrofoam is consumed and converted substantially completely to gas which escapes through the vents where the escaping gas is conventionally burned off.

At the present time the styrofoam patterns used to form a permanent core as above described, have been roughed out by providing an assembly of generally rectangular styrofoam strips which are adhered together with a suitable styrene adhesive compatible with styrofoam. A pattern of this type produces a casting which has sufficient material at every place throughout the required area to permit cutting to the required surface conformation, but the depth of cut may vary, as for example between one-half inch and two inches. Such a casting may of course be machined to final dimensions on a Kellering machine but it requires supervision as a result of the widely varying depth of cut. Thus, if the operator controls the Kellering machine it may require as much as hundreds of hours of time to machine the casting to the exact configuration.

SUMMARY OF THE INVENTION

In accordance with the present invention the styrofoam or other foamed plastic core is machined in a rapid, preferably manually controlled routing operation, to substantially the exact surface configuration required, dimensioned however to leave stock throughout the area for removal in a finish Kellering operation. Since the styrofoam core is accurately machined the thickness of stock removal or depth of cut required of the Kellering machine in the final die finishing operation is substantially uniform and it is thus possible to set the Kellering machine to automatic operation to make a multiplicity of parallel cuts at relatively high speed since the depth of cut is uniform irrespective of the surface configuration.

While for some purposes, manual control of the routing apparatus is most efficient, it is within the contemplation of the present invention to provide automatic control so that the routing cutter will move over the work and the follower will move over the pattern in a multiplicity of parallel strokes spaced apart a distance in accordance with the required accuracy of reproduction, in which the movement of the follower and routing cutter in a direction perpendicular to the direction of the strokes is related to the movement of the routing cutter and follower in the strokes by means responsive to minor displacements of the follower.

BRIEF DESCRIPTION OF THE DRAWING

FIG. 1 is a perspective view of the apparatus for rapid machining of the styrofoam core to required configuration.

FIG. 2 is an enlarged fragmentary section on the line 2–2, FIG. 1.

FIG. 3 is a diagrammatic view showing the relationship between a pattern and an assembly of styrofoam strips into a block.

FIG. 4 is a diagrammatic elevational view suggesting automatic control of the follower and router.

FIG. 5 is a diagrammatic elevational view with parts broken away, showing a different embodiment of the present invention.

DESCRIPTION OF THE PREFERRED EMBODIMENTS

The production of accurate steel dies or conformed sets of dies has in the past required an inordinate amount of machine time. In general terms, the necessary sequence of steps in the production of an accurately machined metal stamping die has been the production of a model, after which patterns were produced. At one time wooden patterns which duplicated the model were formed and these patterns were used in the shaping of sand molds for casting steel into approximately the required shape for the die. More recently, economics have followed from a method in which a consumable rigid plastic material such for example as styrofoam, is shaped by one means or another into approximation of the required shape of the die and the styrofoam member embedded in sand to form a core which is left in the cavity formed by surrounding the core member with sand. The sand mold is provided with the usual gates, risers and vents and the molten steel is poured into the gates where it flows into contact with the material such as styrofoam and consumes the material, or more properly converts it substantially completely to gases which escape through the vents. The pouring process continues until the mold cavity, shaped in accordance with the initial shape of the stryofoam core, is filled.

One method which has been employed in the past to form the styrofoam body to the required shape is to cut styrofoam strips of rectangular cross section into approximate shape and to adhere them together with a suitable styrene plastic compatible with the styrofoam. In general, the block of styrofoam is built up by cutting the styrofoam strips into pieces of the required shape and assembling them together without attempting to produce a smooth continuous surface conformable to the required die surface.

This results in the formation of a cast die block which requires removal of an excessive amount of metal and which furthermore requires careful attention during machining so as to avoid damage to cutters. The machining operation used to finish dies of this type is generally a Kellering operation in which the cutter is moved back and forth in paths occupying closely spaced vertical planes, the cutter being moved vertically on each pass by a template or pattern controlled follower. Due to the irregularities of the styrofoam which are reproduced as irregularities in the cast block, the Kellering operation is necessarily very slow and requires careful attention due to the fact that if cut to final depth in a single pass, the depth of cut may vary from a small fraction of an inch to two inches or more. Alternatively, if the maximum downward displacement of the cutter is limited to eliminate width variations in depth of cut, the first multiplicity of passes may be cutting only during a small fraction of the time.

In order to avoid this there have been efforts to produce a core or cavity forming member of styrofoam by an operation in which small styrofoam spheres are treated with a suitable styrene adhesive and packed together in a mold. This produces a styrofoam body conforming rather closely to the required configuration but it has proved unsatisfactory in the casting step, due possibly to the inclusion of air filled voids in the styrofoam body or for other reasons not fully understood.

The present invention is characterized in the novel step of shaping the styrofoam core or mold cavity forming member by an operation which comprises assembling together generally rectangular blocks cut from styrofoam strips of rectangular cross section, these blocks being dimensioned to provide substantial excess material throughout the area to be machined. Thereafter, the material is routed from the assembled styrofoam block by a pattern controlled, preferably manually operated, router. Inasmuch as the styrofoam is extremely easy to machine the operator may shape the surface of the styrofoam in a series of rapid cuts taken without regard to the depth of cut. Due to the rapidity of the operation, it is preferable for this operation to be carried out manually although of course equivalent results could be obtained by imposing automatic controls. The pattern which is used to control the router may be accurately conformed to the surface desired in the finished piece or in the die and additional stock for the final Kellering operation on the die may be provided by forming a cutting head on the router slightly smaller than the template follower.

After having formed the styrofoam block to have one surface conforming very closely to the desired surface but with the provision of substantially uniform depth of excess stock thereover, the styrofoam body is embedded in sand and molten steel passed through conventional gates into the cavity in the sand occupied by the styrofoam core. This converts the styrofoam to gas which escapes through vents and the operation is continued until the cavity is filled. As the styrofoam is converted to gas and the gas escapes through vents, it is customary to ignite the gas, which is highly inflammable, and completion of the pouring operation is signaled by extinguishment of the gas.

Thereafter, the casting, when cooled, is set up for finishing on a conventional Kellering machine. However, since the preceding steps have produced a die block having substantially uniform thickness of excess stock for removal by the Kellering machine, it is possible to set the Kellering machine for automatic control in relatively rapid back and forth passes with uniform lateral displacement, and to leave the machine unattended. The complete operation, including the final Kellering steps as disclosed herein, represents very great savings in total time as well as a great savings of man hours, since the Kellering operation may be a simple automatic operation.

Referring first to FIG. 3 there is illustrated at P a model pattern having an upper curved surface S which is herein illustrated as a double convex surface. In practice this surface may be rather irregularly curved in accordance with the desired shape of automobile panel parts, such for example as side panels, door panels, tops, decks, fenders or the like. In this FIG. at B is illustrated a styrofoam block composed of sections 10, 12, 14, 16, 18, 20 and 22 cut from styrofoam strip. It will be observed that the high point of the pattern is provided for by the relatively small section 22 of styrofoam and that the falloff at the corners of the body is provided for by the intermediate strip 20 of full width and the end strips 16 and 18 of lesser width. It will further be observed that the block B conforms only very generally in shape to the shape desired in the finished block, which is of course the shape provided in the pattern P.

Little care need be taken in assembling the styrofoam strips into the block B since the material is inexpensive and may be routed to the required shape in a rapid operation substantially independent of the depth of cut. The only real requirement is that sufficient material be provided everywhere so that in the routing operation the entire finished surface has been cut by the router.

Since the sections of the styrofoam are all rectangular the surfaces of adjacent sections are readily adhered together with a suitable styrene adhesive without the inclusion of any appreciable air in the body.

Referring now to FIG. 1 there is illustrated a router comprising a pair of fixed rails 24 and 26. Mounted on the rails are a pair of slides 28 which include within their interiors suitable antifriction bearings such for example as ball bearings, to provide for exceedingly free movement of the slides longitudinally of the rails 24 and 26. Means are provided for insuring exactly equal simultaneous sliding movement of the slides 28 and this movement is herein illustrated as provided by racks 29 connected to the slides 28 and movable therewith, and pinions 30 in mesh with the racks, the pinions being interconnected by a cross-shaft 31 mounted in suitable fixed bearings as illustrated.

Carried by the slides 28 are posts 32 provided with braces 34 and 36, the posts having brackets 38 to which are secured the lower ends of vertical guide rods 40 the upper ends of which are secured to similar brackets concealed in this FIG. by the corner braces 42. The upper ends of the posts 32 are interconnected by a cross frame member 44.

Vertically movable on the vertical guides 40 is an elongated support 46. At the opposite ends of the support 46 are blocks 48 which include antifriction bearings engageable with the vertical guide rods 40. In FIG. 1 an intermediate portion of the support 46 has been cut away to illustrate details otherwise concealed thereby. The support 46 is counterbalanced by weights 50 connected to the ends of the support by flexible chains 52 led over sprockets 54. The arrangement is such that most but not all of the weight of the support 46 and structure carried thereby is counterbalanced so that the support 46 tends to move downwardly to maintain a follower in contact with a template or pattern, as will subsequently be described.

In order to insure exactly vertical movement of the support 46 and simultaneously exactly equal movement of the end blocks 48 connected thereto, a cross-shaft 56 is provided having pinions 58 at opposite ends thereof which mesh with racks 60.

Extending between the blocks 48 are a pair of horizontal guide rods 62 on which is mounted a carriage 64 composed of members 66, 68 and 70 having openings through which the horizontal guide rods 62 extend. Again, suitable antifriction bearings are provided so that movement of the carriage on the rods 63 is exceedingly free. The members 66, 68 and 70 are interconnected by tie rods 72 to form the carriage 64. Carried by the member 68 is a template or pattern follower 74 having a follower portion 76 adapted to engage the upper surface S of the pattern P. Cutting heads 78 and 80 are illustrated which include rotary cutting or routing tools 82 similar in shape to the pattern follower 76 but slightly smaller so as to leave a predetermined substantially uniform thickness of stock, or to leave the styrofoam body or core after routing slightly oversize with reference to a pattern P traversed by follower 76. Thus, in the finished casting of the metal stamping die, the casting will be correspondingly oversize to provide substantially uniform thickness of stock for removal in the final Kellering operation to finish the casting into conformity with pattern P. At 84 there is illustrated a routing tool inverted with respect to the tools 78 or 80 and adapted to produce a counterpart surface of the surface S of the pattern P. Thus, if the router is used to produce a pair of complementary die parts, and if the pattern is upwardly convex as illustrated in FIG. 3, and engaged by follower 76 downwardly directed routers such as those indicated at 78 and 80, will form the styrofoam pattern with an upwardly convex surface at the top of block B conforming closely to the configuration of the surface S. However, the router 84 operating on the underside of a styrofoam block, will produce a counterpart surface or one which is concave, which may be used in casting the mating part of the die set. In other words, the casting formed by pouring into the sand mold having a cavity shaped by a part cut by the routing tool 82, will be the convex die part, whereas the casting formed by pouring into the mold cavity formed by the styrofoam part cut by the router 84 will be the cooperating concave surfaced die part.

After machining of the assembled styrofoam block or blocks as above described, these blocks are embedded in foundry sand, the sand provided with the usual gates, risers and vents in communication with the cavity in the sand occupied by the styrofoam cores or bodies. Thereafter, the melted steel is poured through the gates, converting the styrofoam cores substantially completely to gas which is expelled through the vents, and filling the mold cavities formerly occupied by the styrofoam cores, and thus producing a solid casting one surface of which conforms substantially exactly to the routed surface of the styrofoam core or mold cavity forming member.

Finally, the cooled castings are set up in a Kellering machine which can be set for simple automatic control comprising a multiplicity of back and forth cutting strokes each of which is followed by a predetermined uniform side movement of the cutting tool. In the Kellering operation the tool is therefore guided in a multiplicity of closely spaced vertical planes and is moved vertically in these planes in accordance with its stroke by means of a template or pattern follower, as is well understood. However, at the this time, since the casting produced by the method as so far described, has a surface conforming closely to the required final surface of the die, and requiring only the removal of a substantially uniform thickness of stock therefrom, the Kellering machine may be set for a relatively rapid cutting stroke which may be at uniform speed throughout and furthermore, the machine, since it is adapted to operate at a substantially constant depth of cut throughout, need not be attended. Moreover, the Kellering operation from the outset can consist of cutting strokes in which the cutting tools are cutting at uniform depth throughout the entire stroke rather than a series of initial strokes to remove high points before the cutting tool is capable of cutting to full depth.

Since the router shown in FIG. 1 is most advantageously operated manually, it is of course desirable for the parts to be as light as possible and the slides 28 and structure supported thereby, as well as the support 46, may advantageously be made of a light metal such for example as magnesium.

Instead of using mechanical counterweights to partially counterbalance the weight of the support 46 and structure carried thereby, it is of course possible to provide air cylinders or the like interposed between the slides 28 and the support 46 to counteract a predetermined fraction of the weight of the structure. Similarly, although it is not essential, means may be provided for assisting the other movements, as for example, the horizontal movement of the slides 28 and the transverse movement of the carriage 64.

Since the routing of the styrofoam is accomplished in a plurality of parallel strokes, in which vertical movement of the routing tool 82 is controlled automatically by the follower 76 in association with the pattern P, it is desirable to provide indicators showing the instantaneous transverse position of the carriage 64. This may be by providing pointers 90 on the carriage 64 in association with a scale 92 provided on the support 46.

In the foregoing emphasis has been placed upon the simple construction in which the pattern follower and router or routers are moved manually over the pattern in a plurality of strokes so as to cause the routing cutter to reproduce the contour of the pattern. In some cases it is preferable to provide automatic controls which as applied to the construction shown in FIG. 1, include means for shifting the routers 78 and 80 and the pattern follower 76 laterally by predetermined increments following cutting strokes produced by movement of the slides 28 longitudinally of the rails 24 and 26. This may be accomplished simply by providing a piston and cylinder device 100, as indicated in FIG. 4, with its axis horizontal and suitably connected between the floor and the structure supported by the slides 28. A second piston and cylinder device 102 with the axis of the cylinder vertical, is suitably connected between the slides 28 and the vertically movable support 46. If desired, automatic means (not shown) may be provided effective to set the members 66, 68 and 70 laterally of the rails by predetermined increments so as to produce a multiplicity of closely spaced cuts adapted to reproduce the contour of the pattern to the required accuracy.

For this purpose the follower, here designated 104, is mounted for swinging movement relative to the movable support 106 and is adapted to control suitable valve means within a housing 108 so as to control admission and exhaust of air or hydraulic fluid from the piston and cylinder devices 100 and 102. Details of this construction are not illustrated herein because they are well understood and constitute the control instrumentalities of a machine sold under the trademark "Hydro-tel" by Cincinnati Milling and Grinding Machines, Inc., and also an attachment for converting milling machines to automatic control sold by Turchan Follower Machine Company of Detroit, Michigan. In this connection it will be noted that vertical movement of the frame 46 by the vertical piston and cylinder device 102 may be controlled relative to a constant rate of advance of the slides 28 by the horizontal piston and cylinder device or devices 100. Alternatively, the control may be such as to vary both the rate of horizontal and vertical movement so as to produce the desired contour on the styrofoam.

Referring now to FIG. 5 there is indicated diagrammatically a different embodiment of the invention in which corresponding parts are given the reference characters previously applied to the construction shown in FIG. 1. In this construction a follower 110 is illustrated carried by a support 112 to which the follower is relatively movable. The construction may be of the type illustrated in FIG. 4 in which movement of the follower 110 relative to the support 112 controls valve means which in turn control a vertical and a horizontal piston and cylinder device for effecting automatic control. On the other hand, the follower 110 may be fixed to the support 112, as suggested in FIG. 1, so that movement of the follower over a pattern is manually controlled.

In this case one of the routing cutters 114 is connected to the follower support 112 by suitable means such as the rigid rods 72. The follower support 112 and the router support 116 are movable as a unit on horizontal support rods 62. However, a second routing cutter 118 is provided on a support 120 which is also horizontally movable on rails 62. However, movement of the support 120 is toward and away from the follower support 112 and this is accomplished specifically by providing a rack 122 which is connected to the follower support 112 for movement therewith. A second rack 124 is rigidly connected to the second router support 120. Intermediate the racks 122 and 124 is a pinion 126 rotatable about a fixed pivot support in the elongated support 46.

From the foregoing it will be observed that as the follower 110 is moved step by step to the left to effect traverse strokes occupying spaced vertical planes, the routing cutter and its supports 118 and 120 are moved stepwise to the right by identical increments. The arrangement of this is that the routing cutter 114 will effect substantial duplication of the pattern located below the follower 110. On the other hand, the routing cutter 118 will produce a shape which is laterally reversed. In other words, configurations appearing at the right hand side of the routed contour at the left of the tracer will appear at the left hand side of the router contour which is at the right of the tracer, all as viewed in FIG. 4. This arrangement is particularly useful since it permits simultaneous production of right and left hand parts which are identical in design.

Obviously, the supports 116 and 120 may also carry routers extending upwardly therefrom, such as the router 84 seen in FIG. 1, to produce two pairs of core members for casting two sets of male and female die parts, one of which is a mirror image of the other.

The method as described herein involves very significant economies both in time and in the utilization of manpower over methods which have heretofore been standard in the industry.

I claim:

1. A pattern controlled routing machine capable of producing from a single unsymmetrical three-dimensional pattern surface a pair of mold core bodies of contours substantially identical with the pattern surface except for provision of a substantially uniform thickness of excess material for subsequent removal by machining from castings made therefrom, the surfaces of said core bodies having a male-female relationship to provide a pair of castings which after machining form a first die set to form sheet metal to a configuration substantaily identical with the pattern surface, said machine comprising:

a frame comprising a pair of horizontal rails;
 slides on said rails;
 posts on said slides;
 a vertically movable elongated support extending between said posts and having end portions slidable thereon;
 a first carriage movable horizontally on said elongated support;
 a pattern follower and a router carried by said carriage and extending in the same direction therefrom; and
 a second router carried by said carriage and extending therefrom in a direction opposite to the direction of said pattern follower and first router from said carriage.

2. A machine as defined in claim 19 comprising:

biasing means connected to said elongated support operable to urge it in a direction to cause the pattern follower to traverse a path across a pattern occupying a vertical plane intersecting the pattern;
 means for moving said slides along said rails in traverse strokes to cause said follower to travel in said vertical plane; and
 means for setting said carriage incrementally to different positions along said elongated support between successive movements of said slides along said rails to cause said follower to travel over the pattern in a multiplicity of spaced parallel vertical planes.

3. A machine as defined in claim 1 which is also capable of producing from the same pattern a second pair of mold core bodies of mirror-reversed contour with respect to the pattern surface and having a male-female relationship to provide a second pair of castings forming a second die set to form sheet metal to a mirror-reversed configuration otherwise substantially identical with the pattern surface:

said machine comprising a second carriage movable horizontally on said elongated support;
 a router on said second carriage extending in the same direction therefrom as the direction of extension of said pattern follower from said first carriage;
 a second router on said second carriage extending therefrom in a direction opposite to the direction of extension of said pattern follower from said first carriage;
 means for moving said slides along said rails in traverse strokes to cause said follower to travel in said vertical plane;
 means for setting said first carriage incrementally to different positions along said elongated support between successive movements of said slides along said rails to cause said follower to travel over the pattern in a multiplicity of spaced parallel vertical planes; and
 means responsive to movement of said first carriage on said elongated support in one direction relative thereto to move said second carriage thereon in the opposite direction.

4. A machine as defined in claim 1 comprising a graduated scale on said elongated support and a pointer on the carriage carrying said follower to provide a visible indication of the location of the vertical plane in which said follower is moving during any particular traverse stroke of said slides.